United States Patent
Billman et al.

[11] Patent Number: 6,028,384
[45] Date of Patent: Feb. 22, 2000

[54] ACTUATOR

[75] Inventors: Christopher Joseph Billman, Springfield; Dennis R. Dozier, Nashville, both of Tenn.

[73] Assignee: CEI, Springfield, Tenn.

[21] Appl. No.: 09/208,100

[22] Filed: Nov. 17, 1998

[51] Int. Cl.[7] .............................. H02K 7/06; H02K 7/20; F16H 37/06; F16K 31/02; F16K 31/44

[52] U.S. Cl. ..................... 310/83; 310/112; 74/665 N; 251/129.11; 251/249.5

[58] Field of Search ...................... 310/83, 75 R, 310/112, 96, 98, 99, 101, 118; 318/9, 12–15; 74/640, 665 R, 724, 665 L, 665 M, 665 N, 421 R, 421 A, 424.8 UA; 475/5–7, 10, 149, 174, 332; 251/129.01, 129.1, 129.11, 248, 249.5

[56] References Cited

U.S. PATENT DOCUMENTS

| | | | |
|---|---|---|---|
| 2,356,590 | 8/1944 | Jacobsen | 110/101 |
| 4,616,164 | 10/1986 | Kenny et al. | 318/666 |
| 4,688,448 | 8/1987 | Hollis et al. | 74/665 L |
| 4,706,512 | 11/1987 | McKernon et al. | 74/405 |
| 4,733,737 | 3/1988 | Falamak | 180/7.1 |
| 4,871,246 | 10/1989 | Manzoni | 359/873 |
| 4,898,360 | 2/1990 | VonHayn et al. | 251/129.01 |
| 5,226,454 | 7/1993 | Cabalfin | 137/870 |
| 5,417,083 | 5/1995 | Eber | 62/528 |
| 5,506,460 | 4/1996 | Steinhart et al. | 310/112 |

*Primary Examiner*—Nestor Ramirez
*Assistant Examiner*—Dang Dinh Le
*Attorney, Agent, or Firm*—Lucian Wayne Beavers

[57] ABSTRACT

The present invention is a new type of an electromechanical actuator that combines two rotary outputs from a solitary electrical input into a single molded housing. The actuator comprises an input assembly responsive to an external electrical control source. Preferably, the control source provides a control signal for each valve door to be controlled. The actuator also comprises a first geartrain assembly responsive to the input control assembly and a second geartrain assembly responsive to the input control assembly. The first geartrain assembly includes a first motor responsive to the input control assembly. A first output gear is operably connected to the first motor and a first rotatable output coupler is connected to the first output gear. The second geartrain assembly includes a second motor responsive to the input control assembly. A second output gear is connected to the second motor and a second rotatable output coupler is connected to the second output gear. Preferably, the rotatable outputs are co-axially and concentrically mounted. Methods of rotating output couplers to open and close valve doors are also disclosed.

28 Claims, 6 Drawing Sheets

ACTUATOR

BACKGROUND OF THE INVENTION

The present invention relates to devices for converting electrical inputs into rotary outputs. Small electro-mechanical actuators are used by the automotive industry to drive the valve doors present in the car's heating, ventilation, and air-conditioning (HVAC) units. These actuators convert an electrical input into a rotary output that opens and closes the door in question.

The majority of high end automobiles today include the option for a split zone HVAC system. The single module provides air to the driver at one temperature and to the front seat passenger at a different temperature, simultaneously. The temperature for each zone is controlled by two separate doors mounted along the same axis. Most HVAC suppliers utilize a separate actuator to run each door. Usually, each actuator is mounted at opposite ends of the valve assembly.

The HVAC supplier faces two problems when using two separate actuators. First, it takes more labor and fasteners to install the two actuators. This leads to higher module cost. Secondly, the wire harness is more complicated and expensive because it has to power two actuators mounted a distance apart. Three, the two actuators take up space in the module that could be used for other purposes, including reducing the size of the module.

What is needed is a device that combines the functions of two actuators into one. What is needed is a device that reduces the wire harness complexity for mounting actuators in an HVAC system. What is needed is an alternate method of operating a dual zone HVAC system. Heretofore, no such devices have existed.

SUMMARY OF THE INVENTION

The present invention relates to devices for converting a single electrical input or connection to two rotational outputs. More particularly, the present invention relates to an actuator for converting a single external electrical control input into two rotational outputs. In one embodiment, the single external control input comprises a separate control signal for each valve door to be operated. The single external control source is connected to an input assembly which routes separate input control signals to each motors. Each motor is connected through a separate drive assembly to a rotary output. Preferably the rotary outputs are co-axially mounted.

One embodiment of the actuator comprises one input control assembly adapted to respond to an external control source; a first drive assembly responsive to the input control assembly; and a second drive assembly responsive to the input control assembly. The first drive assembly includes a first motor responsive to the input control assembly; a worm wheel connected to the first motor; and a first rotatable output coupler connected to the worm wheel. The second drive assembly includes a second motor responsive to the input control assembly; a worm wheel connected to the second motor; and a second rotatable output coupler connected to the worm wheel. The output couplers are respectively connected to valve doors to operate the valve doors by a single external control source.

Accordingly, one object of the present invention is to provide two distinct rotary outputs from a single package. A further object of the present invention is to operate each output independently from one another by using a control circuit for each motor.

Another object of the present invention is to provide a means for both rotary functions to be controlled through one electrical connection in place of two, which are normally needed.

Another object of the present invention is to provide co-axially mounted rotary outputs. A further objective is to provide the co-axially mounted rotary outputs through concentric rotatable couplers.

Another object of the present invention is to control both motors with a single printed circuit board.

Another object of the present invention is to increase the amount of usable surface area of a heating ventilating and air-conditioning (HVAC) module by use of a concentric actuator to replace two actuators.

Another object of the present invention is to operate a split-zone HVAC system.

Another object of the present invention is to reduce labor and wire harness complexity of actuators that run an HVAC system.

Another object of the present invention is to eliminate the requirement to use two actuators mounted a distance apart, thereby reducing harness complexity and expense.

Another object of the present invention is to install an actuator for an HVAC system using two fasteners instead of six.

Another object of the present invention is to provide a means of operating at least two valve doors with a single actuator by co-axially mounting the rotatable output couplers. Typically, one rotatable output coupler per one valve door. A further object is to concentrically mount the rotatable output couplers.

Another object of the present invention is to provide manufacturers with more latitude in design of HVAC modules due to the actuator's smaller size.

Other objects and advantages of the present invention will be apparent from the following detailed discussion of the preferred embodiments with reference to the attached drawings and claims.

BRIEF DESCRIPTION OF THE DRAWINGS

FIG. 5 shows a partial section view cut along section line 5—5 shown in FIG. 4a.

DESCRIPTION OF THE PREFERRED EMBODIMENTS

Figure 1:
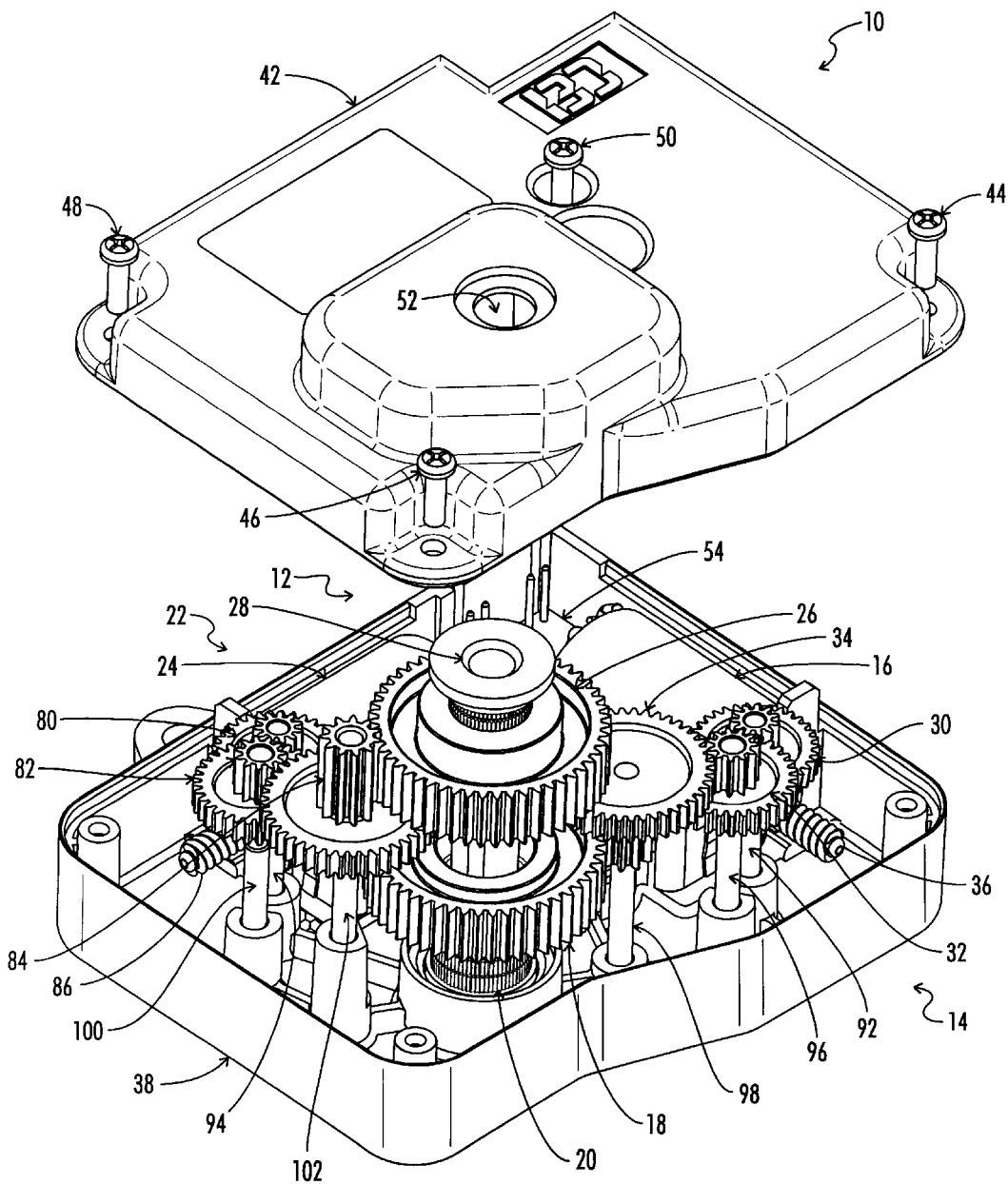
FIG. 1 shows an exploded perspective view of one embodiment of the present invention.

The present invention relates to devices for producing at least two rotatable outputs from a single input. Particular embodiments of this invention relate to heating, ventilation, and air-conditioning (HVAC) units installed in automobiles.

The present invention provides the ability to operate two valve doors independently from a single electrical connection or input. The single input may include a control signal for each valve door to be operated. One such external control source is a Delco control source, part number: CJ4-KSP16254226; another is part number: CJ4-ESP-16268376 pulse/continuous control head.

The present invention will be best understood from the following detailed description of preferred embodiments and attached drawings, wherein like reference numerals and characters refer to like parts, and by reference to the following claims.

Figure 7:
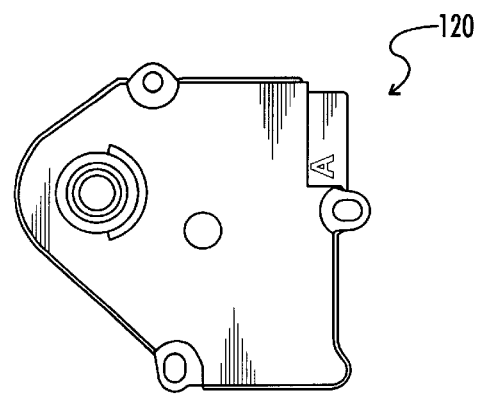
FIG. 7 shows a plan view of a prior art single actuator for operating a single valve door.

One embodiment of the present invention is for an actuator 10 shown in exploded perspective view in FIG. 1. FIG. 7 shows a plan view of a prior art actuator 120 for operating a single valve door from a single electrical control connection. Heretofore, only one valve door could be operated by one actuator—the one actuator, in turn, connected to one electrical external source. Two valve doors required two actuators, and so on. In one embodiment, the actuator 10 comprises an input control assembly 12 responsive to an external electrical control source. The actuator 10 also includes a first geartrain assembly 14. The first geartrain assembly 14 includes a first motor 16 responsive to the input control assembly 12. A first output gear 18 is operatively connected to the first motor 16. The actuator 10 also includes a first rotatable output coupler 20 connected to the first output gear 18. A second geartrain assembly 22 is responsive to the input control assembly 12. The second geartrain assembly 22 includes a second motor 24 responsive to the input control assembly 12. A second output gear 26 is connected to the second motor 24. A second rotatable output coupler 28 is connected to the second output gear 26.

In one embodiment, the first geartrain assembly 14 comprises a worm wheel 30 connected to the first motor 16. A first middle gear 32 connects the worm wheel 30 to the first output gear 18. In one embodiment, the first geartrain assembly 14 comprises a second middle gear 34 connecting the first middle gear 32 to the first output gear 18. The first geartrain assembly 14 may also comprise a crossed-axis helical gear 36 connecting the first motor 16 to the worm wheel 30.

Figure 5:
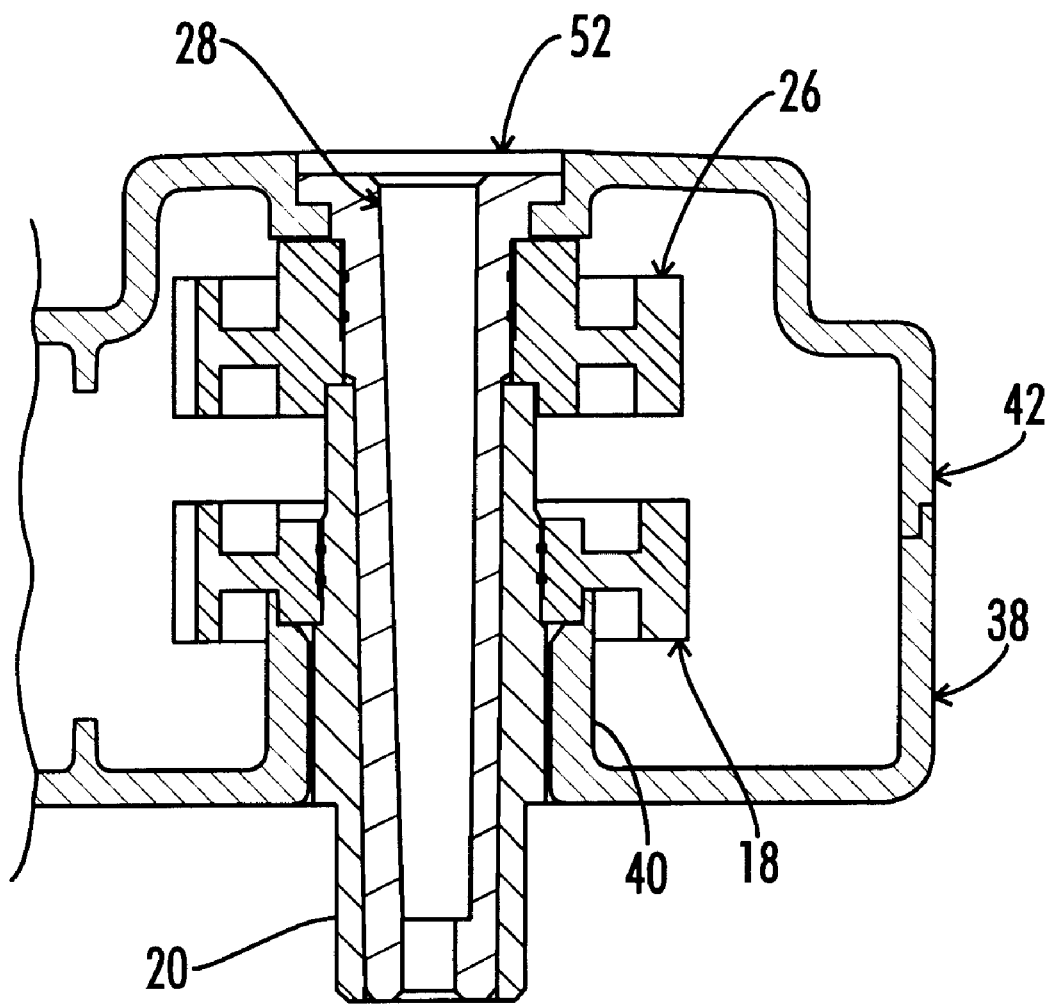

In the actuator 10 shown in FIG. 1, the first rotatable output 20 is co-axial with the second rotatable output coupler 28. In one embodiment, the actuator 10 comprises a base 38 having an open ended boss 40 in which the first rotatable output coupler 20 is mounted and on which the first output gear 18 is supported. A partial section view shown in FIG. 5 most clearly shows the open boss 40 supporting the first output gear 18. In the embodiment shown in FIG. 5, the second output gear 26 is co-axial with the first output gear 18.

Typically, the actuator 10 comprises a case 42 secured to the base 38. In FIG. 1 a plurality of screws are used to secure the case 42 to the base 38. The plurality of screws includes a first screw 44, a second screw 46, a third screw 48, and a fourth screw 50. Clearly, other embodiments securing the case 42 to the base 38 will be apparent to those skilled in the art, for instance, snapped interfaces and the like.

In one embodiment the case 42 includes a hole 52 co-axial with the second output gear 26, thus allowing the case 42 to rotatably secure the second output gear 26 in position. In one embodiment the second rotatable output coupler 28 is seated in the second output gear 26. This is shown in the section view in FIG. 5. In one embodiment the second rotatable output coupler 28 is seated in the first rotatably output coupler 20, wherein the second rotatable output coupler 28 rotates independent of the first rotatable output coupler 20.

One embodiment of the actuator 10, the input control assembly 12 comprises a printed circuit board 54 having four motor pins 56, 58, 60 and 62; and four input pins 64, 66, 68 and 70. A first two of the four motor pins, namely 56 and 58, are connected to the first motor 16 and a second two of the four motor pins, namely 60 and 62, are connected to the second motor 24.

Generally, the printed circuit board 54 comprises four circuits including a first-motor power input circuit 72, a first motor ground input circuit 74, a second-motor power input circuit 76, and a second-motor ground input circuit 78. Typically, the first-motor power input circuit 72 connects a first of the four input pins, 64, to one of the first two of the four motor pins, namely 56. The first-motor ground input circuit connects a second of the four input pins, 66, and another of the first two of the four motor pins, 58. The second-motor power input circuit 76 connects a third of the four input pins, 68, and one of the two of the four motor pins 60. And, the second-motor ground input circuit 78 connects a fourth of the four input pins 70 and another of the second two of the four motor pins 62.

Another embodiment of the present invention includes an actuator 10 comprising one input control assembly 12 adapted to respond to an external control source; and a first geartrain assembly 14 responsive to the input control assembly 12. Preferably the first geartrain assembly 14 includes a first motor 16 responsive to the input control assembly 12, a worm wheel 30 connected to the first motor 16, and a first rotatable output coupler 20 connected to the worm wheel. The actuator 10 also includes a second geartrain assembly 22 responsive to the input control assembly 12. Generally, the second geartrain assembly includes a second motor 24 responsive to the first input control assembly 12, a worm wheel 80 connected to the second motor 24, and a second rotatable output coupler 28 connected to the worm wheel 80.

Generally, the second geartrain assembly 22 includes a first middle gear 82 and a second middle gear 84. The first middle gear 82 is connected to the worm wheel 80, and the second middle gear 84 connects the first middle gear 82 to the second output gear 26. Typically a crossed-axis helical gear 86 connects the second motor 24 to the worm wheel 80.

Embodiments of the actuator 10 include the first geartrain assembly 14 comprising a first output gear 18 connecting the worm wheel 30 to the first rotatable output coupler 20. In some embodiments the second geartrain assembly 22 comprises a second output gear 26 co-axial with the first output gear 18 and connecting the second geartrain assembly worm wheel 80 to the second rotatable output coupler 28. The first rotatable output coupler 20 may be mounted in the first output gear 18 and the second rotatable output coupler 28 may be mounted in the second output gear 26.

As mentioned previously, the input control assembly, in some embodiments, comprises four circuits. The four circuits include a first circuit 72 having an input pin 64 adapted to connect to an external source and a first first-motor pin 56 connected to the first motor 16, wherein the first circuit input pin 64 is electrically connected to the first-motor pin 56. The second circuit 74 has an input pin 66 adapted to connect to an external control source and a second first-motor pin 58 connected to the first motor 16 wherein the second circuit input pin 66 is electrically connected to the second first-motor pin 58. The third circuit 76 has an input pin 68 adapted to connect to an external source and a first second-motor pin 60 connected to the second motor 24, wherein the third circuit input pin 68 is electrically connected to the first second-motor pin 60. The fourth circuit 78 has an input pin 70 adapted to connect to an external control source and a second second-motor pin 62 connected to the second motor 24, wherein the fourth circuit 78 input pin 70 is electrically connected to the second second-motor pin 62.

Figure 2:
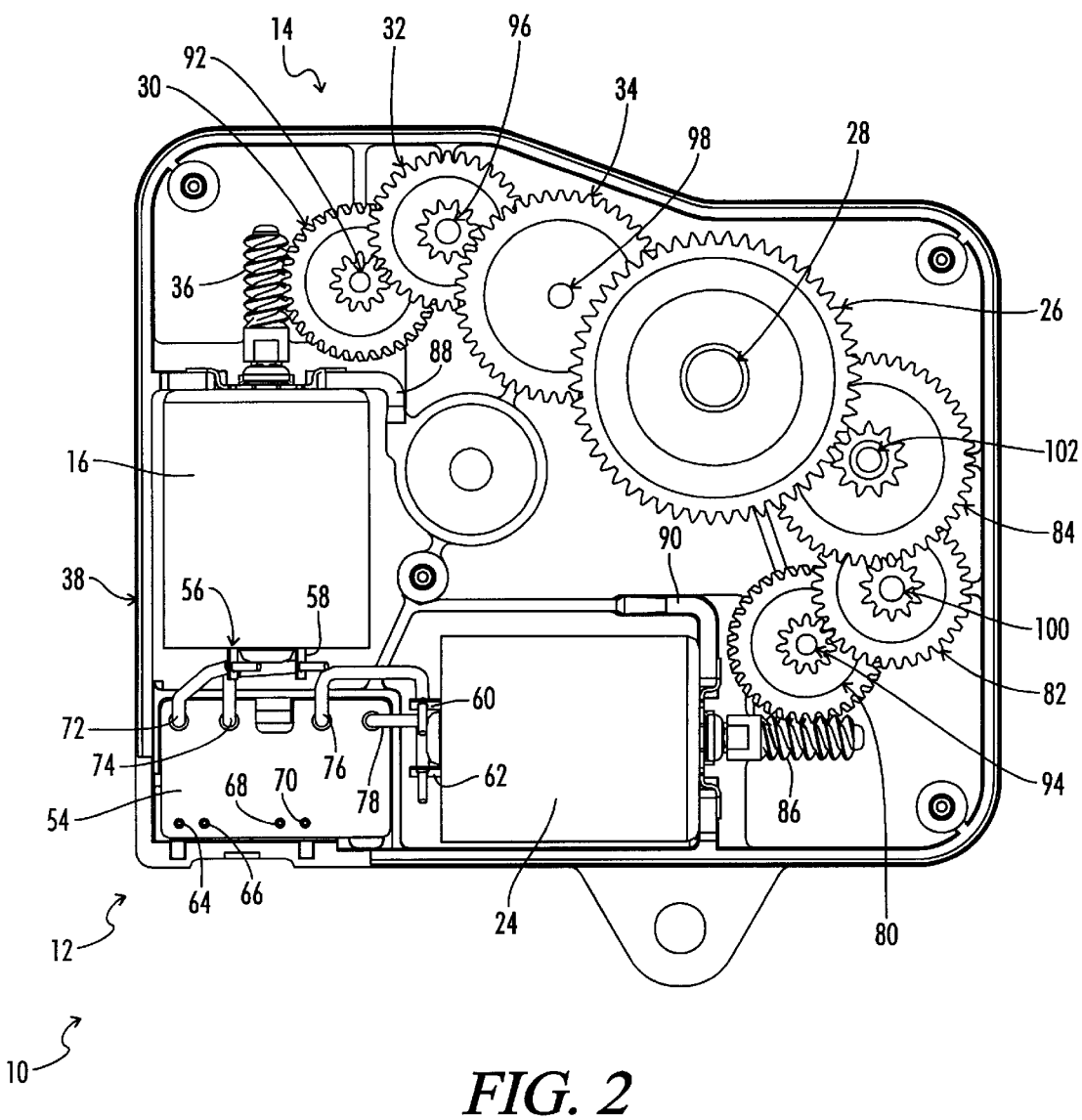
FIG. 2 shows a plan view of the actuator shown in FIG. 1. The case is removed to show the interior of the actuator.
Figure 3:
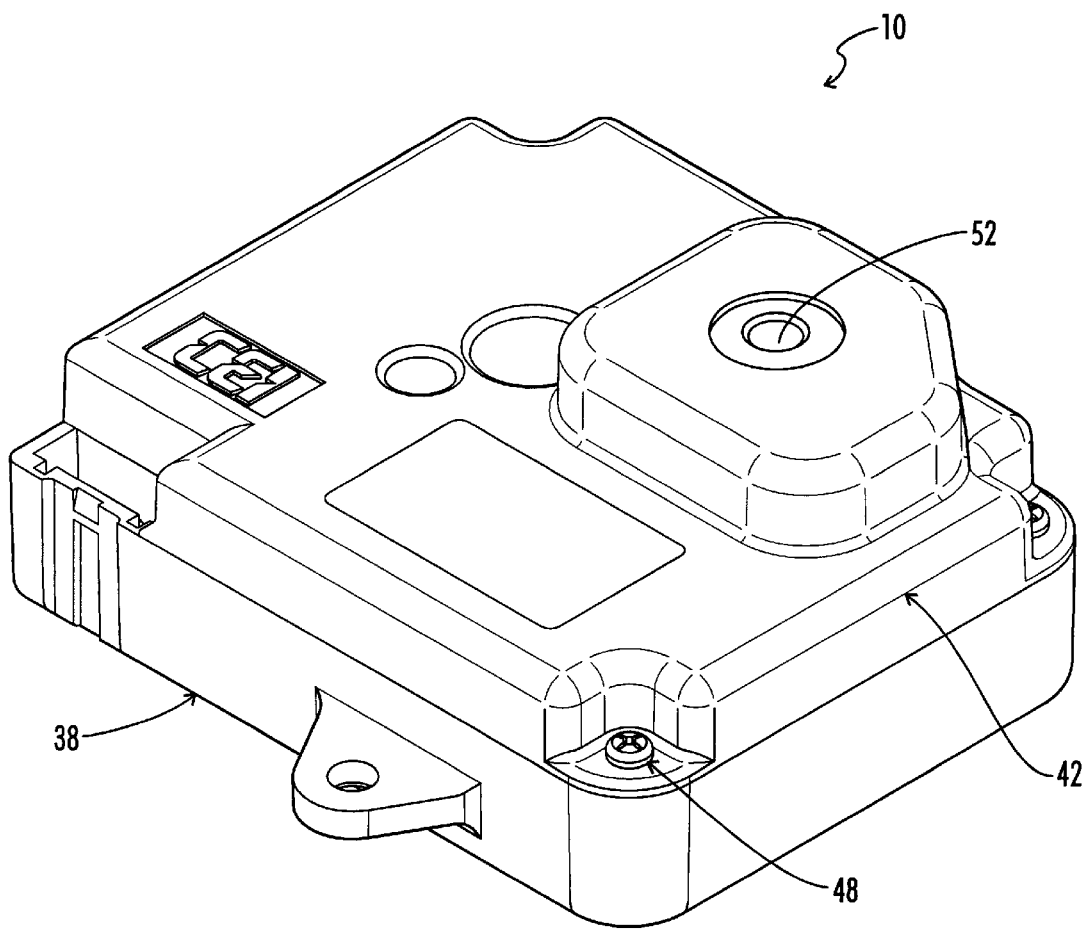
FIG. 3 shows a perspective view of the actuator with the case secured in place.

FIG. 2 shows means for retaining the first and second motors. Typically, the base 38 includes two sets of motor retention ribs 88 and 90 for retaining the first and second motors, the first motor 16 and the second motor 24, respectively. Typically, the first and second motors 16 and 24, respectively, are pressed into one and another of the two sets of motor retention ribs 88 and 90, respectively. Other means of securing the motors within the base will be apparent to those of skill in the art, such means include the use of adhesives and other mounting structures.

The actuator may include a first worm wheel shaft 92 pressed into the base 38, wherein the worm wheel 30 of the first geartrain assembly 14 is retained in position by the first worm wheel shaft 92; and a second worm wheel shaft 94 pressed into the base 38, wherein the worm wheel 80 of the second geartrain assembly 22 is retained in position by the second worm wheel shaft 94. Typically, the first and second worm wheel shafts 92 and 94 retain the worm wheels 30 and 80, respectively, such that the worm wheels are free to rotate.

In one embodiment of the present invention the first geartrain assembly 14 comprises a first output gear 18 connected to the first rotatable output coupler 20, a first and second middle wheels 32 and 34, respectively, on a first and second middle wheel shafts 96 and 98, respectively, wherein the first and the second middle wheel shafts 96 and 98 are pressed into the base. The first middle wheel 32 connects the first geartrain worm wheel 30 to the second middle wheel 34, which connects the first middle wheel 32 to the first output gear 18, whereby the first rotatable output coupler 20 is connected to and rotated by the first geartrain worm wheel 30. The embodiment may also include the second geartrain assembly comprising a second output gear 26 connected to the second rotatable output coupler 28, and first and second middle wheels 82 and 84, respectively, on first and second middle wheels shafts 100 and 102. Generally the first and second middle wheel shafts 100 and 102 are pressed into the base, wherein the first middle wheel 82 connects the second gear train worm wheel 80 to the second middle wheel 84, which connects the first middle wheel 82 to the second output gear 26, whereby the second rotatable output coupler 28 is connected to and rotated by the second geartrain worm wheel 80.

It will be apparent to those skilled in the art, that other means for transferring motor mechanical outputs to rotational outputs other than geartrain assemblies will be effective in the present invention. As such use of the term "geartrain assembly" is not limited to interconnected gears having teeth, but is meant to include belts and drives and other similar mechanically equivalent structure. The term "gears" is interchangeable with wheels, as used in the invention, except where otherwise provided.

Accordingly one embodiment of the present invention is for an actuator comprising an input control assembly responsive to an external control source; a first drive assembly responsive to the input control assembly, the first drive assembly including a first motor responsive to the input control assembly; and a second drive assembly responsive to the input control assembly, the second drive assembly including a second motor responsive to the input control assembly. The actuator also includes a first rotatable output coupler connected to the first motor; and a second rotatable output coupler connected to the second motor. As previously mentioned in some embodiments the first drive assembly is a first geartrain assembly and the second drive assembly is a second geartrain assembly. Preferably the first geartrain assembly comprises a first output gear connecting the first motor to the first rotatable output coupler; and the second geartrain assembly comprises a second output gear connecting the second motor to the second rotatable output coupler.

In one embodiment the actuator comprises a base having an open-ended boss in which the first rotatable output coupler is mounted. In one embodiment the first drive assembly comprises a first output gear supported on the boss and connecting the first motor to the first rotatable output coupler. In one embodiment the second drive assembly comprises a second output gear connecting the second motor to the second rotatable output coupler. Preferably the second output gear is co-axial with the first output gear.

Figure 6:
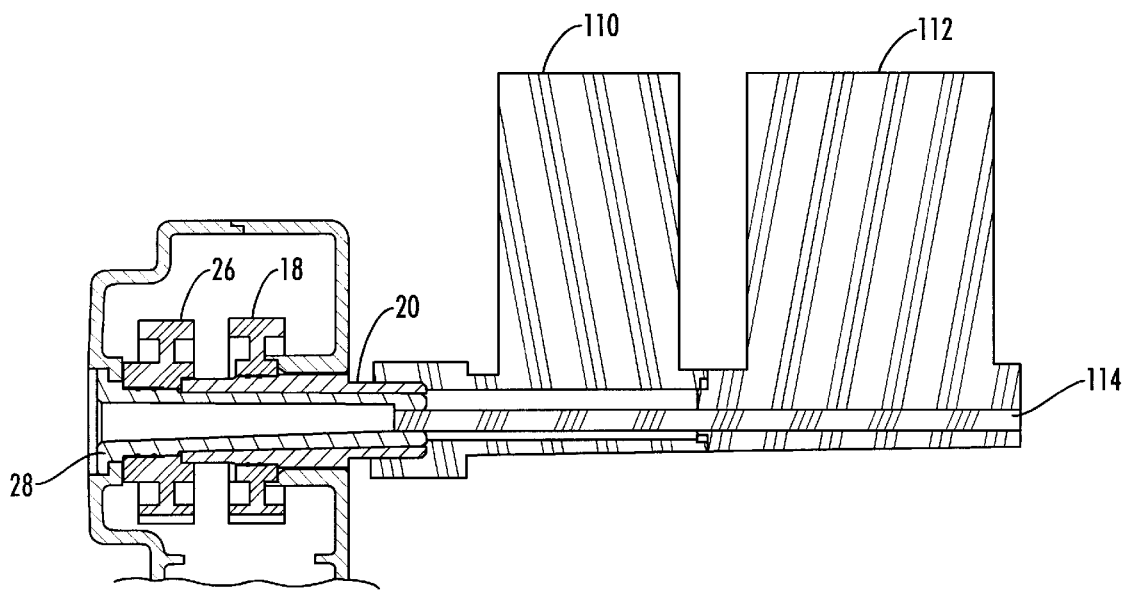
FIG. 6 shows a partial sectioned side view of the actuator connected to two valve doors.

Referring to FIG. 6, one operable arrangement for operating valve doors is disclosed. In the embodiment shown in FIG. 6, a first valve door 110 is connected to the first rotatable output coupler 20. A second valve door 112 is connected to the second rotatable output coupler 21 through a rod 114 extending from the second rotatable output coupler 21.

The present invention also includes a method of operating valve doors by rotating output couplers attached to the valve doors comprising the steps of utilizing a single electromechanical actuator 10 to open and close at least two valve doors; converting an electrical input into at least two rotary outputs that open and close the at least two valve doors; controlling a first and a second motor 16 and 24 with the electrical input; rotating a first and a second output controller 20 and 28 with the first and second motor 16 and 24, respectively; and opening and closing a first and a second valve door, 110 and 112, respectively, with the first and the second output coupler 20 and 28, respectively. The method may also include the step of co-axially mounting the first and second output couplers 20 and 28.

One embodiment of the method comprises the step of independently rotating the first 20 and the second 28 output couplers with independently controlled first 14 and second 22 geartrains connected to the first 16 and second 24 motors, respectively.

Figure 4A:
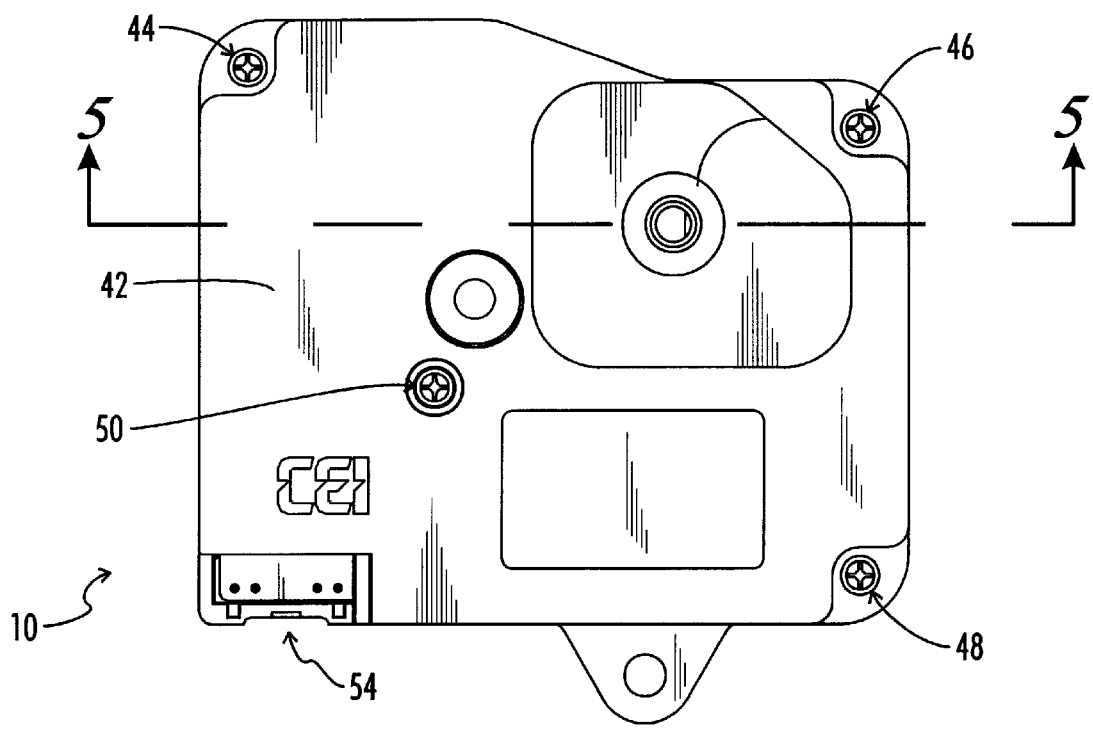
FIG. 4a shows a plan view of the actuator shown in FIG. 1.
Figure 4B:
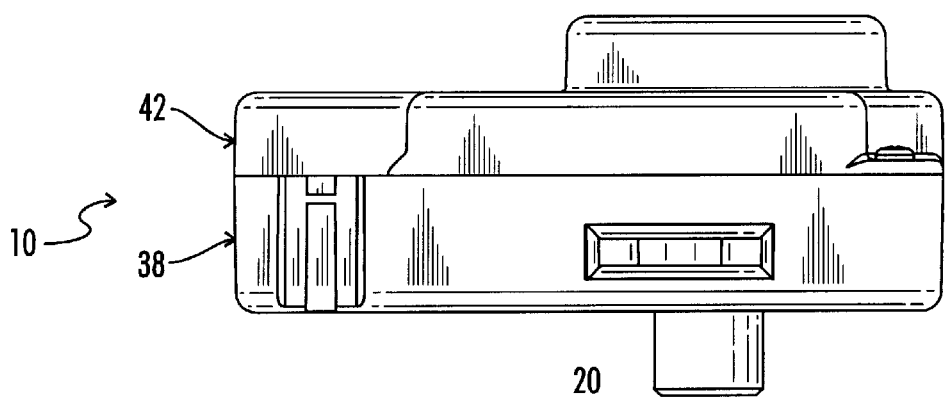
FIG. 4b shows an elevated side view of the actuator shown in FIG. 1.

Another embodiment of the invention comprises the step of increasing an amount of usable space by combining functions of two standard actuators into one concentric shaft actuator 10 having a volume smaller than a volume of two standard actuators combined. Refer to FIG. 4a, which shows a plan view of one embodiment of the actuator 10. In the embodiment shown in FIG. 4a the actuator 10 has a width, more or less aligned parallel to the first geartrain 14, of approximately 103 millimeters. The actuator 10 includes a depth, more or less aligned along the second geartrain assembly 22, of approximately 102.36 millimeters. FIG. 4b shows an elevated side view of the actuator 10 in which the height is approximately equal to 43 millimeters.

Another embodiment of the method of the present invention comprises the step of controlling the first 14 and second 24 motors from a printed circuit board 54.

Thus, although there have been described particular embodiments of the present invention of a new and useful Actuator it is not intended that such references be construed as limitations upon the scope of the invention except as set forth in the following claims.

What is claimed is:

1. An actuator for a dual-zone air conditioning system comprising:

an input control assembly responsive to an external control source;

a first drive assembly responsive to the input control assembly, the first drive assembly including a first motor responsive to the input control assembly;

a first rotatable output coupler connected to the first motor;

a second drive assembly responsive to the input control assembly, the second drive assembly including a second motor responsive to the input control assembly;

a second rotatable output coupler connected to the second motor;

a first valve door connected to the first rotatable output coupler for controlling air flow to a first zone of the air conditioning system; and a second valve door connected to the second rotatable output coupler for controlling air flow to a second zone of the air conditioning system.

2. The actuator of claim 1, wherein:

the first drive assembly is a first geartrain assembly; and
the second drive assembly is a second geartrain assembly.

3. The actuator of claim 2, wherein:

the first geartrain assembly comprises a first output gear connecting the first motor to the first rotatable output coupler; and the second geartrain assembly comprises a second output gear connecting the second motor to the second rotatable output coupler.

4. The actuator of claim 3, wherein the first geartrain assembly comprises:

a worm wheel connected to the first motor; and
a first middle gear connecting the worm wheel to the first output gear.

5. The actuator of claim 4, wherein the first geartrain assembly comprises a second middle gear connecting the first middle gear to the first output gear.

6. The actuator of claim 5, wherein the first geartrain assembly comprises a crossed-axis helical gear connecting the first motor to the worm wheel.

7. The actuator of claim 1, wherein the first rotatable output coupler is co-axial with the second rotatable output coupler.

8. The actuator of claim 7, comprising a base having an open-ended boss in which the first rotatable output coupler is mounted.

9. The actuator of claim 8, wherein:

the first drive assembly comprises a first output gear supported on the boss and connecting the first motor to the first rotatable output coupler;

the second drive assembly comprises a second output gear connecting the second motor to the second rotatable output coupler; and the second output gear is co-axial with the first output gear.

10. The actuator of claim 9, comprising a case secured to the base, the case rotatably securing the second output gear in position, and including a hole co-axial with the second output gear, wherein the second rotatable output coupler is seated in the second output gear.

11. The actuator of claim 9, wherein the second rotatable output coupler is seated in the first rotatable output coupler and the second rotatable output coupler rotates independent of the first rotatable output coupler.

12. The actuator of claim 7, wherein the second rotatable output coupler rotates inside of, and independent of the first rotatable output coupler.

13. The actuator of claim 7, wherein the second rotatable output coupler is rotatably housed in the first rotatable output coupler.

14. The actuator of claim 1, wherein the first rotatable output coupler is mounted concentrically relative to the second rotatable output coupler.

15. The actuator of claim 1, wherein the second rotatable output coupler rotates inside of, and independent of, the first rotatable output coupler.

16. The actuator of claim 1, wherein the second rotatable output coupler is rotatably housed in the first rotatable output coupler.

17. The actuator of claim 1, wherein:

the first drive assembly comprises a first output gear connecting the first motor to the first rotatable output coupler; and the second drive assembly comprises a second output gear connecting the second motor to the second rotatable output coupler.

18. The actuator of claim 17, wherein the first output gear is coaxial with the second output gear; and wherein the first rotatable coupler is coaxial with the second rotatable coupler.

19. The actuator of claim 18, wherein the second rotatable output coupler is rotatably housed in the first rotatable output coupler.

20. An actuator comprising:

one input control assembly adapted to respond to an external control source, the input control assembly including:

a first circuit having an input pin adapted to connect to an external control source and a first first-motor pin connected to the first motor, wherein the first circuit input pin is electrically connected to the first first-motor pin;

a second circuit having an input pin adapted to connect to an external control source and a second first-motor pin connected to the first motor, wherein the second circuit input pin is electrically connected to the second first-motor pin; and a third circuit having an input pin adapted to connect to an external control source and a first second-motor pin connected to the second motor, wherein the third circuit input pin is electrically connected to the first second-motor pin; and a fourth circuit having an input pin adapted to connect to an external control source and a second second-motor pin connected to the second motor, wherein the fourth circuit input pin is electrically connected to the second second-motor pin;

a first geartrain assembly responsive to the input control assembly, the first geartrain assembly including,
a first motor responsive to the input control assembly,
a worm wheel connected to the first motor,
a first rotatable output coupler connected to the worm wheel; and a second geartrain assembly responsive to the input control assembly, the second geartrain assembly including,
a second motor responsive to the input control assembly,
a worm wheel connected to the second motor, and a second rotatable output coupler connected to the worm wheel.

21. The actuator of claim 20, wherein the first geartrain assembly comprises a first output gear connecting the worm wheel to the first rotatable output coupler.

22. The actuator of claim 21, wherein the second geartrain assembly comprises a second output gear co-axial with the first output gear and connecting the second geartrain assembly worm wheel to the second rotatable output coupler.

23. The actuator of claim 22, wherein the first rotatable output coupler is mounted in the first output gear and the second rotatable output coupler is mounted in the second output gear.

24. The actuator of claim 20, comprising:
a base having two sets of motor retention ribs, the first and second motors pressed into one and another of the two sets of motor retention ribs, respectively;
a first worm wheel shaft pressed into the base, wherein the worm wheel of the first geartrain assembly is retained in position by the first worm wheel shaft; and
a second worm wheel shaft pressed into the base, wherein the worm wheel of the second geartrain assembly is retained in position by the second worm wheel shaft.

25. The actuator of claim 24, wherein:
the first geartrain assembly comprises a first output gear connected to the first rotatable output coupler, a first and second middle wheels respectively on a first and second middle wheel shafts pressed into the base, wherein the first middle wheel connects the first geartrain worm wheel to the second middle wheel, which connects the first middle wheel to the first output gear, whereby the first rotatable output coupler is connected to and rotated by the first geartrain worm wheel; and
the second geartrain assembly comprises a second output gear connected to the second rotatable output coupler, a first and second middle wheels respectively on a first and second middle wheel shafts pressed into the base, wherein the first middle wheel connects the second geartrain worm wheel to the second middle wheel, which connects the first middle wheel to the second output gear, whereby the second rotatable output coupler is connected to and rotated by the second geartrain worm wheel.

26. An actuator comprising:
an input control assembly responsive to an external control source;
a first drive assembly responsive to the input control assembly, the first drive assembly including:
a first motor responsive to the input control assembly, the motor including a shaft and a first drive gear attached to the shaft; and
a first geartrain assembly having a first driven gear directly engaged by the first drive gear;
a first rotatable output coupler connected to the first motor via the first geartrain assembly;
a second drive assembly responsive to the input control assembly, the second drive assembly including:
a second motor responsive to the input control assembly, the second motor including a second shaft and a second drive gear attached to the second shaft; and
a second geartrain assembly having a second driven gear directly engaged by the second drive gear;
a second rotatable output coupler connected to the second motor via the second geartrain assembly; and
wherein the first and second driven gears are non-coaxial, and the first and second rotatable output couplers are coaxial.

27. An actuator comprising:
an input control assembly responsive to an external control source;
a first drive assembly responsive to the input control assembly, the first drive assembly including a first motor responsive to the input control assembly;
a first rotatable output coupler connected to the first motor;
a second drive assembly responsive to the input control assembly, the second drive assembly including a second motor responsive to the input control assembly;
a second rotatable output coupler connected to the second motor; and
wherein the input control assembly includes a printed circuit board having four motor pins and four input pins wherein a first two of the four motor pins are connected to the first motor and a second two of the four motor pins are connected to the second motor.

28. The actuator of claim 27, wherein the printed circuit board comprises four circuits including a first-motor power input circuit, a first-motor ground input circuit, a second-motor power input circuit, and a second-motor ground input circuit, wherein:
the first-motor power input circuit connects a first of the four input pins and one of the first two of the four motor pins;
the first-motor ground input circuit connects a second of the four input pins and another of the first two of the four motor pins;
the second-motor power input circuit connects a third of the four input pins and one of the second two of the four motor pins; and
the second-motor ground input circuit connects a fourth of the four input pins and another of the second two of the four motor pins.

* * * * *